Figure 1:
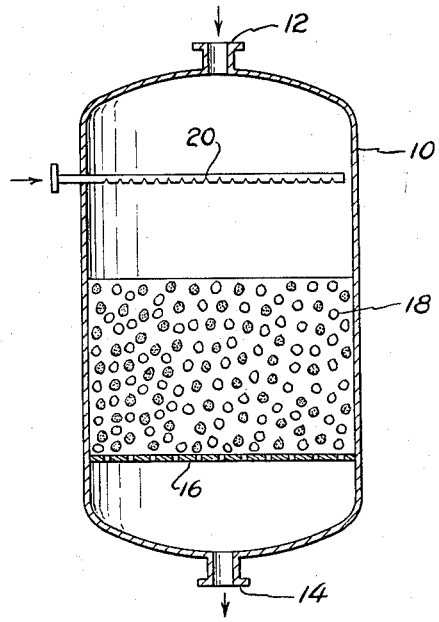

Dec. 29, 1964

E. THRUN 3,163,597

ION EXCHANGE PROCESS

Filed March 30, 1961

INVENTOR

*Eberhard Thrun*

BY

*Bailey, Stephens & Huettig*
ATTORNEYS great# United States Patent Office 3,163,597
Patented Dec. 29, 1964

3,163,597
ION EXCHANGE PROCESS
Eberhard Thrun, Mainz, Germany, assignor to Maschinenfabrik Augsburg-Nurnberg A.G., Nurnberg, Germany
Filed Mar. 30, 1961, Ser. No. 99,500
Claims priority, application Germany, Apr. 5, 1960,
M 44,887
4 Claims. (Cl. 210—30)

This invention relates to an ion exchange process and, in particular, to a process involving the use of a bed composed of active and inert materials.

Liquids contaminated by ionized particles must be cleaned before they are usitable for industrial use. This is especially important in preparing water for use in boilers, dye works, breweries, nuclear reactors and the like. Ion exchange materials, such as grains of synthetic resins, are used to clean the water. After the ions in the water and resins have interchanged, the synthetic resin must be regenerated.

In an ion exchange bed, small quantities of inert materials not participating in the ion exchange have been used along with the active ion exchange materials. In such cases, the inert material is one that has a specific weight between that of the active anion and cation material so that the inert material can be used as a thin boundary layer to separate the layers of active material.

However, in some operations, as when a large volume of a slightly contaminated liquid is to be cleaned in an ion exchanger, the capacity of the apparatus and the quantity of ion exchange material needed cannot be determined alone from the type of materials involved. The shape of the ion exchange bed, the time of contact required between the liquid and the bed, the velocity of the flow of the liquid, the overall time for the completion of the process, and other factors determine the quantity of the active ion exchange material to be used. A complete filling of an ion exchange apparatus with anion and/or cation material is not desirable if only a portion of the capacity of the active material is required for a particular process. This invention avoids the aforesaid difficulties by producing a process for performing an ion exchange reaction in the preparation of liquids, especially water for boilers, dye works, breweries, nuclear reactors and the like. In this invention, the steps of charging the bed, washing the bed, and regenerating the bed are carried out in the presence of materials inert to the ion exchange reaction along with the active materials.

In general, according to this invention, instead of using a bed composed entirely of active ion exchange material, a portion of the active material is replaced by a material which is inert to the ion exchange reaction so that the full effective capacity of the amount of active material can be used up to the point where a regeneration of the active material is required. Further advantages lie in that specific amounts of bed material can be chosen which are most favorable to the overall operation of the process and do not require the shortest possible ion exchange time which influences the success of the operation. The method of this invention is usable in intermittently operating cation, anion, and mixed exchange beds, as well as in a continuously operating apparatus. This method is also usable in the so-called liquid safety beds which, while serving as mixed filter beds, are filled with cation and anion exchange materials, as, for example, when they are joined to a complete de-salting apparatus and require only a little conductivity. The inert materials not participating in the reaction preferably have shapes and physical characteristics similar to the active exchange materials. Chemically, they must be neutral. Slight differences between the specific weights of the materials enable the materials to be separated by being sorted. Usable inert materials are quartz, anthracite, glass, synthetic resin, and other inert materials of suitable particle size. In order to avoid losses by friction between particles, a rounded shape particle is preferred. The inert materials must not be attacked either by the liquid being treated or by the regenerating fluid and should not possess any ion exchange qualities.

Figure 2:
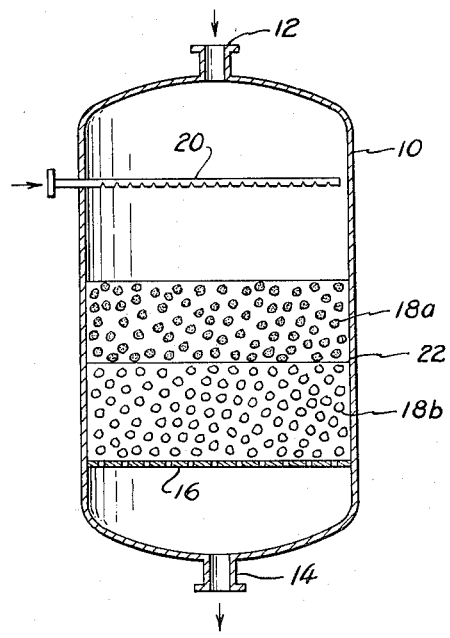

The means by which the objects of the invention are obtained are described more fully with reference to the accompanying drawings, in which:

FIGURE 1 is a cross-sectional view through an ion exchanger containing a mixed bed of active and inert materials; and FIGURE 2 is a similar view of an ion exchanger in which the active and inert materials are separated into superimposed layers.

As shown in FIGURE 1, the ion exchanger is composed of a tank 10 having at its top a raw liquid inlet 12 and at its bottom a treated liquid outlet 14. Supported by a screen 16 within the tank is a mixed bed 18 composed of a mixture of active ion exchange material and inert material. Regenerating liquid is introduced into tank 10 above bed 18 by means of the nozzle 20.

In operation, the raw contaminated liquid enters tank 10 through the inlet 12 and passes downwardly through the mixed bed 18 with the treated liquid removed through the outlet 14. When the active ion exchange material needs to be regenerated, a flushing fluid is introduced into the vessel through fitting 14 and stirs the granules in bed 18 so that when the flushing liquid is drained through fitting outlet 14, the active and inert materials of different specific weights settle into separate layers. Regenerating liquid is then introduced through nozzle 20 and flows through the layer of spent ion exchange material to regenerate the same. Following this regeneration, gas or liquid is again introduced through the fitting 14 upwardly through the bed to stir the particles in the separated layers together and thus again form the mixed bed 18.

In FIGURE 2, an active ion exchange material is used having a specifically heavier weight than the inert material. Thus the ion exchange bed is composed of a lower heavier layer 18b of active material and an upper lighter layer 18a of inert material.

When the active material is regenerated, the regenerating fluid is introduced through the bottom fitting 14 and the tank 10 flooded up to the boundary 22 between the active and inert materials so that the active material 18b alone is treated by the regenerating fluid.

The details relating to the present invention were examined with the aid of a filter as shown in FIG. 1. This filter was 80 cm. in dia. and its cylindrical portion had a length of 200 cm. The filling consisted of 320 litres of inert material (polyethylene of 0.4 mm. grain size) and of 180 litres of standard commercial weakly acid carboxyl resin with a total useful volume capacity of 117 eq. and 0.65 eq. (equivalents) litre respectively. The mixed bed was charged with 6 m.$^3$/hour of a $10^{-2}\%$ aqueous calcium chloride solution. Emergence of the calcium from the bottom outlet of the filter took place after 130 hours of operation. The total utilized initial capacity of the ion exchanger of 0.65 eq./litre was attained in 12 minutes by the use of a regenerant of 220% of the theoretical, corresponding to 135 litres of 7% hydrochloric acid.

With the specific load of 12 m.$^3$ per hour of the calcium chloride solution per cubic meter of filling adopted in this instance it was found that the cation exchanger, if not diluted by inert matter, had a useful capacity of 0.55 eq./litre only.

Having now described the means by which the objects of the invention are obtained, I claim:

1. In the operation of an ion exchanger in which a liquid such as water is passed through a bed of ion exchange material to prepare the liquid for use in boilers, breweries, dye works, nuclear reactors and the like, the improvement in that the process steps of forming the ion exchange bed, treating liquid passed through said bed, flushing the bed and regenerating the bed are performed with the active ion exchange material together with material inert to the ion exchange reaction and of substantially the same physical size and shape as said ion exchange material and in an amount to increase the useful capacity of the ion exchange material to a value above that existing when the ion exchange material is used alone.

2. In the method of claim 1, said inert material being mixed with the ion exchange material in the ion exchange bed.

3. In the method of claim 2, further comprising the steps of flushing the mixed bed to separate the ion exchange and inert materials, regenerating the ion exchange material separate from the inert material, and then remixing the materials into the bed.

4. In the method of claim 1, further comprising forming a bed composed of superimposed layers of ion exchange material and inert material.

References Cited by the Examiner
UNITED STATES PATENTS
2,666,741   1/54   McMullen _____ 210—30

MORRIS O. WOLK, *Primary Examiner.*

CARL F. KRAFFT, *Examiner.*